United States Patent [19]

Bagg et al.

[11] Patent Number: 5,266,292
[45] Date of Patent: Nov. 30, 1993

[54] METHOD OF EXTRACTING DINITROGEN PENTOXIDE FROM ITS MIXTURE WITH NITRIC ACID

[75] Inventors: Greville E. G. Bagg, Waltham Abbey; Anthony W. Arber, Waltham Cross, both of England

[73] Assignee: Secretary of State for Defence in the United Kingdom, London, England

[21] Appl. No.: 847,989

[22] PCT Filed: Jul. 15, 1991

[86] PCT No.: PCT/GB91/01249
§ 371 Date: Apr. 16, 1992
§ 102(e) Date: Apr. 16, 1992

[87] PCT Pub. No.: WO92/02451
PCT Pub. Date: Feb. 20, 1992

[30] Foreign Application Priority Data

Aug. 4, 1990 [GB] United Kingdom ............ 9017135.6

[51] Int. Cl.$^5$ .................. C01B 21/22; C01B 21/24; C01B 21/38; C01B 21/00
[52] U.S. Cl. .................. 423/400; 423/235; 423/390.1
[58] Field of Search .................. 423/235, 235 D, 390, 423/400

[56] References Cited

U.S. PATENT DOCUMENTS 1,348,874  8/1920  Guye .................... 423/400
3,044,844  7/1962  Maury et al. .......... 423/235

OTHER PUBLICATIONS

Chemical Abstracts, vol. 97, No. 6, Aug. 1983 #97-43480b.
Chemical Abstracts vol. 101, No. 6 Aug. 1984 #101:40593f.
Chemical Abstracts, vol. 106 No. 16 Apr. 1987 122387j.

Primary Examiner—Gregory A. Heller
Attorney, Agent, or Firm—Nixon & Vanderhye

[57] ABSTRACT

Method of extracting dinitrogen pentoxide ($N_2O_5$) from its mixture in nitric acid, which consists of providing a solution of the mixture in an inert organic solvent, stripping out the $N_2O_5$ from solution in a carrier gas stream containing ozone, and subsequently condensing the $N_2O_5$ out of the gas stream by contact with further inert organic solvent. The presence of ozone suppresses the dissociation of the $N_2O_5$ transferred to the gas stream into dinitrogen tetroxide ($N_2O_4$). In a preferred embodiment the stripping and absorbing steps take place continuously in adjacent stripping and absorbing columns respectively having organic solvent recirculating through each.

11 Claims, 1 Drawing Sheet

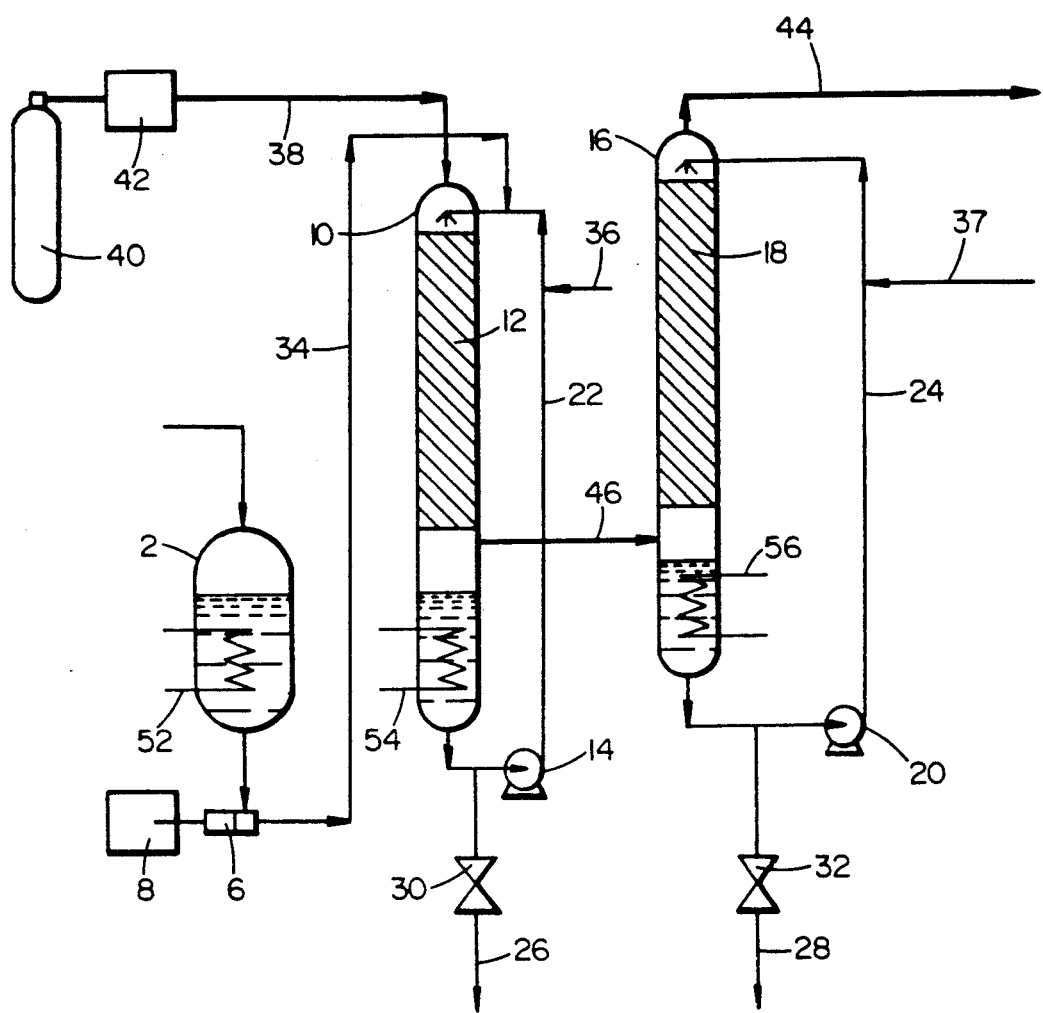

METHOD OF EXTRACTING DINITROGEN PENTOXIDE FROM ITS MIXTURE WITH NITRIC ACID

This invention relates to the extraction of dinitrogen pentoxide ($N_2O_5$) from its mixture with nitric acid, and in particular to the extraction of $N_2O_5$ from solutions of such mixtures in organic solvents.

It is known that concentrated solutions of $N_2O_5$ in nitric acid can be prepared by the electrochemical oxidation of dinitrogen tetroxide ($N_2O_4$) in concentrated nitric acid. This represents one of the most cost-effective methods of producing $N_2O_5$ currently available.

According to USSR Inventor's Certificate SU-1089047A, a mixed $N_2O_5$/nitric acid solute may be precipitated from concentrated solutions of $N_2O_5$ in nitric acid by the addition thereto of moderate amounts of cold liquid $N_2O_4$. $N_2O_5$ has a strong affinity for nitric acid, and in order to extract from the solute relatively pure $N_2O_5$, the solute is sublimed at 5° C. to 10° C. and the sublimate condensed onto a cold surface at $-20°$ C. Once the acid-free solid $N_2O_5$ has been prepared, it may then be dissolved in a suitable carrier, typically an inert organic solvent such as a chlorinated alkane, for subsequent use in a wide variety of nitration reactions.

There are a number of disadvantages associated with the method of $N_2O_5$ extraction disclosed in SU-1089047A. Sublimation must be conducted at a reduced pressure of typically about 50 mm Hg in order to avoid the need for higher sublimation temperatures which would otherwise cause the $N_2O_5$ to decompose rapidly. The build-up of condensed $N_2O_5$ gradually reduces the thermal efficiency of the cold surface on which the sublimate forms. Any moisture present during the condensation of the $N_2O_5$ sublimate and its subsequent dissolution in an organic solvent produces yet more nitric acid by reaction between the moisture and the $N_2O_5$.

It is an object of the present invention to overcome the disadvantages associated with this aforementioned method.

Accordingly, a method of extracting $N_2O_5$ from its mixture with nitric acid comprising the steps of:
(a) providing a solution of the mixture in a first body of inert organic solvent,
(b) contacting the solution with a carrier gas containing ozone at a temperature sufficient to transfer at least part of the $N_2O_5$ from the solution into the carrier gas, and
(c) condensing the $N_2O_5$ transferred to the carrier gas in a second body of inert organic solvent at a temperature lower than that of step (b).

For the present method to be effective, the mixture preferably contains a minor amount of nitric acid i.e. less than 50% by weight of the total amount of $N_2O_5$ and nitric acid, and will typically contain from 4 to 40% nitric acid. The mixture may, for example, comprise $N_2O_5$ contaminated with nitric acid during it preparation by contact with moisture, or it may comprise an $N_2O_5$ solute recovered from a mixture of $N_2O_4$ and $N_2O_5$ in nitric acid. Typically the first body of solvent will contain from 2 wt % to 20 wt % $N_2O_5$ and up to 10 wt % nitric acid.

It has been found that by appropriate selection of contact temperature, $N_2O_5$ readily transfers into the gas phase even when step (b) is performed at atmospheric pressure, leaving the relatively involatile nitric acid behind in solution within the first body of inert solvent. The presence of ozone in the carrier gas ensures that any $N_2O_4$ produced by decomposition of the $N_2O_5$ during its vapourisation and subsequent reabsorption in solvent is rapidly reconverted to $N_2O_5$, so obviating the need to conduct step (b) at a pressure which is significantly sub-atmospheric.

Much if not substantially all of the ozone is subsequently dissolved in the second body of inert solvent along with the $N_2O_5$ thereby increasing the effective thermal stability of the recovered $N_2O_5$ and maintaining its purity.

Any moisture present in the carrier gas is converted in step (b) to relatively involatile nitric acid by reaction with $N_2O_5$ and is rapidly absorbed by the first body of inert solvent. Nitric acid contamination of the second body of solvent is thereby reduced or even eliminated. This obviates the need to dry the carrier gas before use in the present method.

The carrier gas itself preferably comprises ozonised oxygen or ozonised air which may conveniently be supplied from a conventional ozoniser, ozonised air being especially preferred because of its relatively lower cost. The carrier gas preferably contains from 0.2 to 4% by weight, and more preferably from 0.5 to 2% by weight, of ozone. An ozone concentration of leas than 2% by weight in most preferred In order to prevent a rapid and potentially hazardous build-up of dissolved ozone in the second body of solvent.

Step (b) is preferably conducted at a temperature of $-10°$ C. to $+30°$ C. more preferably from $-5°$ C. to $+15°$ C. At temperatures within the range $-10°$ C. to $30°$ C., especially $-5°$ C. to $15°$ C., $N_2O_5$ is stripped from solution and does not undergo appreciable thermal decomposition provided the carrier gas is thereafter quickly brought into contact with more solvent in step (c). In order to provide a large surface area of contact between the solution and carrier gas, and to provide a high rate of $N_2O_5$ transfer into the gas phase, step (b) is conveniently conducted within a first packed column. Continuous stripping of the $N_2O_5$ may be performed by contacting the carrier gas and first body of inert organic solvent in continuous countercurrent or continuous cocurrent flow. The first body of solvent is preferably recirculated to promote effective transfer of $N_2O_5$ into the gas phase.

Step (c) is preferably conducted at a temperature of $-15°$ C. or less, preferably $-20°$ C. or less, in order to ensure substantially complete recovery of $N_2O_5$ from the carrier gas. At temperatures below $-50°$ C. no significant improvement in $N_2O_5$ and ozone removal from the carrier gas occurs, but since the vapour pressure of the solvent steadily declines with decreasing temperature so the amount of solvent recovered from the carrier gas into the second body of inert solvent increases and this in turn obviates the need for a subsequent solvent recovery step. For this reason, step (c) may be performed at temperatures typically as low as $-70°$ C. though at the expense of increased cooling costs.

In order to promote efficient and continuous recovery of $N_2O_5$ from the carrier gas, the carrier gas and the second body of inert organic solvent are preferably contacted in countercurrent flow, most preferably within a second packed column. The second body of solvent is preferably recirculated to promote the build up of a high concentration of $N_2O_5$ therein.

The chemical identity of the first and second bodies of solvent are preferably the same to avoid the problem of solvent vapour from the first body contaminating the second. Preferably, this solvent comprises a $C_1$ or $C_2$ chloroalkane, especially dichloromethane, or a chlorofluorocarbon such as a $C_1$ or $C_2$ chlorofluoroalkane.

BRIEF DESCRIPTION OF THE DRAWING

Examples of the invention will now be described in more detail with reference to the accompanying drawing, which illustrates apparatus specifically adapted for performing the present method.

The apparatus illustrated in FIG. 1 comprises a feedstock reservoir 2, a metering pump 6 with a motor 8, a stripper column 10 containing a packed section 12, a stripper column recirculation pump 14, an absorber column 16 containing a packed section 18, and an absorber column recirculation pump 20.

A stripper solvent recirculation line 22 extends from the bottom to the top of the stripper column 10 through the stripper column recirculation pump 14. Similarly, an absorber solvent recirculation line 24 extends from the bottom to the top of the absorber column 16 through the absorber recirculation pump 20. Each of the stripper and absorber recirculation lines has an offtake line 26 and 28 respectively fitted with a valve 30 and 32 respectively. A feedstock transfer line 34 connects between the reservoir 2 and the stripper recirculation line 22 through the metering pump 6. Solvent makeup lines 36 and 37 connect with the stripper recirculation line 22 and absorber recirculation line 24.

A gas inlet line 38 extends from an oxygen supply 40, through an ozone generator 42 and into the top of the stripper column 10. At the top of the absorber column 16 is a gas outlet line 44. The two columns are connected below their respective packed sections by a gas transfer line 46. Cooling coils 52, 54 and 56 are fitted, respectively in the reservoir 2, in the bottom of the stripper column 10 and in the bottom of the absorber column 16. These coils are used to control the temperature of the solvent at various parts of the apparatus.

PROCESS DESCRIPTION

1. With the equipment dry and purged with nitrogen to remove all traces of moisture, a quantity of inert organic solvent is charged to the stripper column 10 and absorber column 16.

2. The absorber column recirculation pump 20 is switched on and the temperature of the solvent in the absorber column 16 brought down to below $-15°$ C. using the cooling coil 56, the actual temperature selected being set by the partial pressures of the components in the gas stream to minimise product and solvent losses. The reactor column recirculation pump 14 is also switched on.

3. The oxygen stream is then switched on from its source 40 to reduce the temperature of the solvent in the stripper column by evaporation, and the ozone generator 42 brought into operation and adjusted for optimum conditions. The oxygen stream passes down the packed section 12 of the stripper column 10 in cocurrent flow with stripper column solvent, through the gas transfer line 46, up the packed section 18 of the absorber column in countercurrent flow with absorber column solvent, and out through the gas outlet line 44.

4. Using the metering pump 6, a solution of $N_2O_5$ and nitric acid in inert organic solvent is continuously metered from the reservoir 2 into the circulating solvent of the stripper column 10. The solvent partially evaporates and cools in the gas stream as it passes down the packed section 12 of the column 10. At the same time, $N_2O_5$ is stripped out of the solution into the gas stream.

5. In the packed section 18 of the absorber column 16, the gas stream contacts the recirculating low temperature absorber solvent which removes from the gas stream the solvent, $N_2O_5$ and ozone carried over from the absorber column 10. Product is continuously removed from the recirculating absorber solvent through the offtake line 28 with the valve 32 open, so that a constant level of solvent in the bottom of the absorber column is maintained. The concentration of the $N_2O_5$ in the product can be reduced by continuously adding fresh solvent at a controlled rate to the recirculating absorber solvent through the makeup line 37.

6. In order to prevent an excessive build-up of nitric acid in the recirculating stripper solvent, the pump 6 is intermittently switched off and stripping allowed to continue until the recirculating solvent is essentially free of $N_2O_5$. Thereafter the oxygen source 40 and recirculation pump 20 are switched off and the nitric acid-laden solvent in the stripper column 10 is drained through the offtake line 26 (with the valve 30 open) for subsequent solvent recovery. The valve 30 is then closed, and a quantity of fresh inert organic solvent is charged to the absorber column 10 through the makeup line 36. Steps 2 to 5 above are then repeated.

EXAMPLES

In the following examples, the stripper and absorber columns were each charged with dichloromethane (41 kg) and recirculated at 1200 kg/hr. Oxygen was fed through the ozone generator to give 1 wt % ozone at an ozone flowrate of 50 g/hr. Dichloromethane solution containing 12 wt % $N_2O_5$ and 4 wt % nitric w. acid was metered in at 0.38 kg/hr. The temperature of the solvent in the bottom of the reservoir, stripper column and absorber column was controlled at, respectively, $5°$ C., $0°$ C. and $-50°$ C. Typical steady-state conditions in the recirculating stripper solvent and absorber solvent are given in Table 1 belo

TABLE 1

| EXAMPLE | RECIRCULATING STRIPPER SOLVENT | | RECIRCULATING ABSORBER SOLVENT | |
|---|---|---|---|---|
| | *wt % $N_2O_5$ | *wt % nitric acid | *wt % $N_2O_5$ | *wt % nitric acid |
| 1 | 5.45 | 1.76 | 12.32 | 0.63 |
| 2 | 5.86 | 1.59 | 11.95 | 0.46 |
| 3 | 5.23 | 1.73 | 12.20 | 0.57 |
| 4 | 4.52 | 4.04 | 12.17 | 0.63 |
| 5 | 5.72 | 1.88 | 12.13 | 0.97 |

*Analysis of samples by Laser-Raman at ambient temperature ($10°$ C.–$20°$ C.)

At $50°$ C. some of the $N_2O_5$ in the product taken from the recirculated absorber solvent was present as a solid suspension.

Similar results were also obtained in one further example (Example 6) with the temperature in the bottom of the absorber column 16 maintained at $-25°$ C. Solvent recovery was required to remove solvent vapour present in the exhaust gases.

We claim:

1. Method of extracting $N_2O_5$ from a mixture of nitric acid and $N_2O_5$ containing less than 50 wt % nitric acid into an inert organic solvent comprising the steps of:
   (a) providing a solution of the mixture in a first body of inert organic solvent, (b) contacting the solution with a carrier gas containing ozone at a temperature of between $-10°$ C. and $30°$ C. to transfer at least part of the $N_2O_5$ from the solution into the carrier gas, the carrier gas comprising ozonized oxygen or ozonized air, and (c) condensing the $N_2O_5$ transferred to the carrier gas in a second body of inert organic solvent at a temperature lower than that of step (b).

2. Method according to claim 1 characterised in that the carrier gas contains from 0.2 to 4 wt % of ozone.

3. Method according to claim 1 characterised in that step (c) is performed at a temperature of from $-15°$ C. to $-70°$ C.

4. Method according to claim 1 characterised in that the solvent of the first and/or second bodies of solvent comprises a $C_1$ or $C_2$ chloroalkane or a chlorofluorocarbon.

5. Method according to claim 1 characterised in that the chemical identities of the first and second bodies of solvent are the same.

6. Method according to claim 1 characterised in that each of the first body of solvent and carrier gas are provided as separate streams.

7. Method according to claim 6 characterised in that the carrier gas and first body of solvent are contacted in step (b) in countercurrent or cocurrent flow.

8. Method according to claim 6 characterised in that the first body of solvent is recirculated.

9. Method according to claim 6 characterised in that the second body of solvent is provided as a separate stream.

10. Method according to claim 9 characterised in that the carrier gas and second body of solvent are contacted in step (c) in countercurent flow.

11. Method according to claim 9 characterised in that the second body of solvent is recirculated.

* * * * *